(No Model.)
L. NELSON.
SEAT FOR AGRICULTURAL MACHINES, &c.
No. 560,228. Patented May 19, 1896.
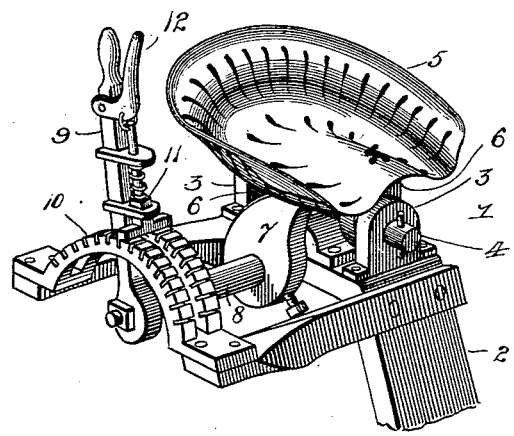
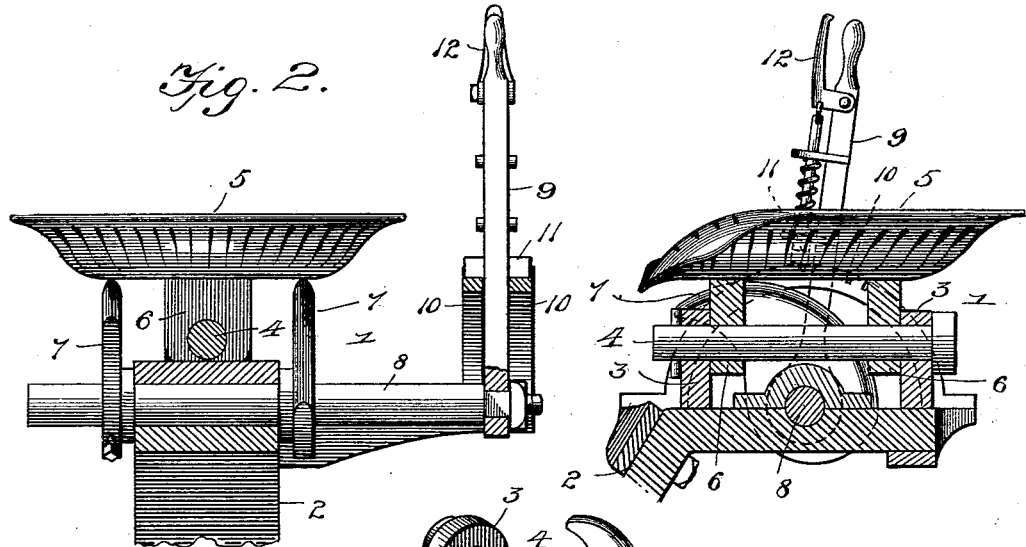
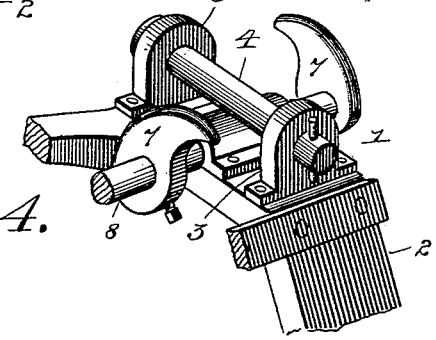
Witnesses
E. N. Monroe
T. F. Riley
Inventor
Louis Nelson.
By his Attorneys,
C. A. Snow & Co.

UNITED STATES PATENT OFFICE.

LOUIS NELSON, OF RENO, MINNESOTA.

SEAT FOR AGRICULTURAL MACHINES, &c.

SPECIFICATION forming part of Letters Patent No. 560,228, dated May 19, 1896.

Application filed January 27, 1896. Serial No. 577,034. (No model.)

*To all whom it may concern:*

Be it known that I, LOUIS NELSON, a citizen of the United States, residing at Reno, in the county of Houston and State of Minnesota, have invented a new and useful Seat for Agricultural Machines, &c., of which the following is a specification.

The invention relates to improvements in seats for agricultural machines and the like.

The object of the present invention is to provide for mowers, reapers, hay-rakes, and various other agricultural machines a pivoted seat adapted to be tilted laterally toward either side of the machine to enable the operator to have a horizontal seat and to sit in a perpendicular position on rolling ground and at any side of a hill.

A further object of the invention is to enable the seat to be readily adjusted by the operator without leaving it, so as to quickly adapt it to the character of the ground.

The invention consists in the construction and novel combination and arrangement of parts hereinafter fully described, illustrated in the accompanying drawings, and pointed out in the claims hereto appended.

In the drawings, Figure 1 is a perspective view of an adjustable seat constructed in accordance with this invention. Fig. 2 is a longitudinal sectional view of the same. Fig. 3 is a transverse sectional view. Fig. 4 is a detail perspective view illustrating the arrangement of the cams for supporting the seat and the pivot of the latter.

Like numerals of reference designate corresponding parts in all the figures of the drawings.

1 designates a seat-supporting frame provided with a standard 2, adapted to be mounted on a mower, reaper, rake, or other agricultural machine. The seat-supporting frame is substantially triangular and extends out laterally from one side of the upper end of the standard, and it is provided with longitudinally-alined bearings 3, receiving a pivot 4, upon which a tilting seat 5 is mounted. The seat is provided with depending bearings 6, which are arranged between the bearings 3 of the seat-supporting frame, and the pivot 4 is retained in the bearings by a suitable key or the like and may be removed to detach the seat. The seat is capable of tilting laterally toward either side of a machine to enable the operator, when the machine is operating on inclined or hilly ground and at an inclination, to sit perpendicularly, and the seat is firmly supported in a horizontal position by oppositely-disposed reversely-arranged cams 7, adjustably mounted on the transverse shaft 8 and presenting curved upper edges to the seat. The transverse shaft is journaled in suitable bearings of the seat-supporting frame, and it has fixed to one end an operating-lever 9, by means of which the cams may be swung forward or rearward to tilt the seat to bring it to a horizontal position. The operating-lever is arranged in an opening of a curved ratchet 10 and carries a spring-actuated pawl or detent 11, which is operated by a latch-lever 12, fulcrumed on the operating-lever adjacent to the handle thereof. The curved ratchet is arranged at one side of the seat-supporting frame and forms a guide for the operating-lever, which is located within convenient reach of the driver to enable him to adjust the seat without leaving the same.

It will be seen that the seat is simple and comparatively inexpensive in construction, that it is adapted to be readily adjusted by the operator without leaving it to enable him to sit continually in an upright position when operating on rolling or hilly ground, and that as it is unnecessary for the operator to use any effort to remain in his seat when the machine is inclined laterally he is enabled to give his entire attention to the machine, thereby greatly facilitating a proper operation thereof.

Changes in the form, proportion, and the minor details of construction may be resorted to without departing from the spirit or sacrificing any of the advantages of this invention.

What I claim is—

1. The combination with a support, of a laterally-tilting seat, oppositely-disposed reversely-arranged cams supporting the seat, and means for operating the cams whereby the seat may be readily adjusted, substantially as described.

2. The combination with a support, of a laterally-tilting seat mounted thereon, a rear transverse shaft, reversely-arranged oppositely-disposed cams mounted on the shaft and supporting the seat, and operating mechanism connected with the shaft and arranged adjacent to the seat, whereby the operator is adapted to adjust the seat without leaving the same, substantially as described.

3. The combination of a seat-supporting frame provided at one side with a curved ratchet, bearings arranged at opposite sides of the frame, a longitudinal pivot arranged in the bearings, a laterally-tilting seat mounted on the pivot, a transverse shaft journaled in suitable bearings of the frame, the reversely-arranged cams fixed to the shaft, located at opposite sides of the pivot, and supporting the seat, and an operating-lever fixed to the shaft adjacent to the ratchet and carrying a pawl or detent for engaging the same, substantially as and for the purpose described.

In testimony that I claim the foregoing as my own I have hereto affixed my signature in the presence of two witnesses.

LOUIS NELSON.

Witnesses:
H. B. HINRICHS,
MAX RICHARD.